United States Patent
Cadot et al.

(10) Patent No.: US 12,150,545 B2
(45) Date of Patent: Nov. 26, 2024

(54) BRUSHING PART AND METHOD FOR MANUFACTURING THE BRUSHING PART

(71) Applicant: FASTEESH, Lyons (FR)

(72) Inventors: Christophe Cadot, Lyons (FR); Benjamin Cohen, Lyons (FR)

(73) Assignee: FASTEESH, Lyons (FR)

( * ) Notice: Subject to any disclaimer, the term of this patent is extended or adjusted under 35 U.S.C. 154(b) by 213 days.

(21) Appl. No.: 17/632,206

(22) PCT Filed: Jul. 6, 2020

(86) PCT No.: PCT/FR2020/051188
§ 371 (c)(1),
(2) Date: Feb. 1, 2022

(87) PCT Pub. No.: WO2021/023921
PCT Pub. Date: Feb. 11, 2021

(65) Prior Publication Data
US 2022/0279918 A1 Sep. 8, 2022

(30) Foreign Application Priority Data
Aug. 2, 2019 (FR) ...................................... 19/08872

(51) Int. Cl.
*A46D 3/06* (2006.01)
*A46B 3/02* (2006.01)
(Continued)

(52) U.S. Cl.
CPC .................. *A46D 3/06* (2013.01); *A46B 3/02* (2013.01); *A46B 3/04* (2013.01); *A46B 5/02* (2013.01);
(Continued)

(58) Field of Classification Search
CPC .... A46B 3/02; A46B 3/04; A46B 5/02; A46B 9/045; A46B 13/023; A46D 3/00;
(Continued)

(56) References Cited

U.S. PATENT DOCUMENTS

| 4,635,313 A | 1/1987 | Fassler et al. |
| 2014/0272761 A1 | 9/2014 | Lowe et al. |

(Continued)

FOREIGN PATENT DOCUMENTS

WO 2019224450 A1 11/2019

OTHER PUBLICATIONS

International Search Report for International Application No. PCT/FR2020/051188; Date of Completion: Sep. 3, 2020; Date of Mailing: Sep. 11, 2020; 4 Pages.

(Continued)

*Primary Examiner* — Randall E Chin
(74) *Attorney, Agent, or Firm* — CANTOR COLBURN LLP

(57) ABSTRACT

A method for manufacturing a brushing part including the following steps: providing the support, pierced with through-holes, passing through the channel formed by the support; forming the tuft of bristles, by assembling a plurality of bristles by one end opposite the free end, so as to form a base of the tuft, so that a diameter of a section of the tuft, in a plane transverse to a direction of extension of the tuft, is greater than a diameter of a through-hole; merging the ends forming the base of the at least one tuft so that an extension of the merged zone in a direction transverse to the direction of extension of the at least one tuft is greater than an extension of the base in the transverse direction before the merging step; inserting the one tuft by force into one of the holes of the channel of the support, depositing glue and filling with resin.

20 Claims, 8 Drawing Sheets

(51) Int. Cl.
*A46B 3/04* (2006.01)
*A46B 5/02* (2006.01)
*A46B 9/04* (2006.01)
*A46B 13/02* (2006.01)
*A46D 3/00* (2006.01)
*A61C 17/22* (2006.01)
*A61C 17/34* (2006.01)

(52) U.S. Cl.
CPC ............ *A46B 9/045* (2013.01); *A46B 13/023* (2013.01); *A46D 3/00* (2013.01); *A46D 3/005* (2013.01); *A61C 17/228* (2013.01); *A61C 17/3481* (2013.01)

(58) Field of Classification Search
CPC ........ A46D 3/005; A46D 3/06; A61C 17/228; A61C 17/3481
See application file for complete search history.

(56) References Cited

U.S. PATENT DOCUMENTS

2016/0278511 A1* 9/2016 Ko .................. A46B 9/045
2021/0161287 A1 6/2021 Cadot et al.

OTHER PUBLICATIONS

Translation of International Search Report for International Application No. PCT/FR2020/051188; Date of Completion: Sep. 3, 2020; Date of Mailing: Sep. 11, 2020; 2 Pages.

Written Opinion for International Application No. PCT/FR2020/051188; International Filing Date: Jul. 6, 2020; Date of Mailing: Sep. 11, 2020; 6 Pages.

English Translation of Written Opinion for International Application No. PCT/FR2020/051188; International Filing Date: Jul. 6, 2020; Date of Mailing: Sep. 11, 2020; 7 Pages.

* cited by examiner

BRUSHING PART AND METHOD FOR MANUFACTURING THE BRUSHING PART

CROSS REFERENCE TO RELATED APPLICATIONS

This application is a National Stage of PCT Application No. PCT/FR2020/051188 filed on Jul. 6, 2020, which claims priority to French Patent Application No. 19/08872 filed on Aug. 2, 2019, the contents each of which are incorporated herein by reference thereto.

TECHNICAL FIELD

The present invention concerns the field of tooth cleaning equipment.

BACKGROUND

The tooth brushing is a necessary task for good oral hygiene, but it is seen as tedious, and therefore often poorly done. To facilitate brushing and ensure better movements, it is well known to use electric toothbrushes, whose heads are set in motion by motors. However, with such a brush, a good gesture of brushing is still necessary, and requires a minimum of dexterity and autonomy. Furthermore, the time required for a good brushing, generally 2 or 3 minutes, is often felt to be too long. On the other hand, for certain specific populations, such as the elderly, dependent people, with loss of autonomy, or even children, such a brush is not always suitable. In all cases, tooth brushing is therefore poorly carried out, because of the time perceived as too long, or because of the poorly done gesture; there is therefore a need to simplify brushing. In order to remedy these problems, a device has been proposed comprising a substantially U-shaped brushing part, configured to be placed on the dentition of a user, internally forming a mouth guard intended to receive all or part of the dentition of a jaw of a user; the mouth guard thus formed must be covered with bristles intended for brushing the dentition, arranged on the internal walls of the mouth guard so as to ensure a brushing as efficient as possible.

The known methods for inserting brushing bristles on usual tooth cleaning equipment, such as for example manual or electric toothbrushes, are not suitable for obtaining an effective brushing configuration when applied to the internal walls of the U-shaped mouth guard of a brushing part configured to conform as a whole the shape of all or part of the dentition to be cleaned. The known methods do not make it possible in particular to fix ultra-fine and short bristles in a brushing part which must be flexible, fine and of complex geometry. With the known methods, the brushing bristles are fixed on a wall of simple geometry, such as a substantially flat surface for example, the inclination of the bristles relative to the surface not varying by more than about 15 degrees.

BRIEF SUMMARY

The aim of the invention is therefore to propose a solution to all or part of these problems.

To this end, the present invention concerns a method for manufacturing a brushing part, the brushing part comprising a support configured in a U-shape to be placed on the dentition of a jaw of a user, the support forming a mouth guard intended to receive on an internal side all or part of this dentition, the brushing part comprising at least one tuft of brushing bristles projecting on the internal side of the mouth guard by a free end of the bristles of the at least one tuft, the method comprising the following steps:

providing the support, the support being drilled with at least one through hole, passing through the mouth guard formed by the support, between the internal side and an external side opposite to the internal side of the mouth guard;

forming the at least one tuft of bristles, by assembling a plurality of bristles by an end opposite the free end, so as to form a base of the at least one tuft, so that a diameter of one section of the at least one tuft, along a plane transverse to a direction of extension of the at least one tuft, that is to say greater than a diameter of the at least one through hole;

merging the ends forming the base of the at least one tuft so as to form a merged zone in one part, so that an extension of the merged zone in a direction transverse to the direction of extension of the at least one tuft is greater than an extension of the base in the transverse direction before the merging step;

forcefully inserting at least one tuft into at least one hole in the support mouth guard.

According to one embodiment, the invention comprises one or more of the following characteristics, alone or in a technically acceptable combination.

According to one embodiment, the support provided at the arrangement step is made of flexible plastic, for example an elastomeric thermoplastic, preferably a Styrene-Ethylene-Butylene-Styrene.

According to these arrangements, it is possible to obtain a brushing part with an effective brushing configuration when the brushing bristles are applied to the internal walls of the mouth guard configured to conform as a whole the shape of all or part of the dentition to be cleaned. The method makes it possible in particular to fix ultra-fine and short bristles, in the flexible, fine and complex geometry. According to these arrangements, the brushing bristles can be fixed on a wall of complex geometry, which differs very significantly from a substantially flat surface, the inclination of the bristles relative to the surface of the internal side of the mouth guard being able to vary by more than 15 degrees.

According to one embodiment, the arrangement step comprises:
a step of manufacturing the support;
a step of drilling at least one hole passing through the mouth guard, between the internal side and an external side opposite to the internal side of the mouth guard, formed by the support;

According to one embodiment, the step of manufacturing the support comprises a molding of the support from a molding mold.

According to one embodiment, the molding mold is in two parts.

According to one embodiment, the mold includes no holes or spikes, so that the molded support also includes no holes or spikes.

According to one embodiment, a part of the mold includes at least one spike projecting on a surface of the part of the mold, so that the molded support includes at least one molded hole in the wall of the mouth guard, the at least one molded hole having the shape of the at least one spike of the mold.

According to one embodiment, part of the mold includes at least one hole, so that the molded support includes at least one spike projecting on the internal face of the mouth guard, and the step of manufacturing the support 1' comprises a sub-step of removing at least one of the spikes before the step of making at least one hole in place of the at least one removed spike.

According to one embodiment, the step of drilling the at least one through hole also comprises the drilling of another non-through hole corresponding to the at least one through hole, the at least one through hole being drilled according to a first diameter and about a first axis, and the other non-through hole, being drilled according to a second diameter about the first axis, the second diameter being greater than the first diameter, the other non-through hole emerging into the external side of the mouth guard.

According to one embodiment, the first diameter is comprised between 0.2 mm and 2 mm.

According to these arrangements, an insertion depth of the tufts, and therefore a length of the free end, are determined by an appropriate depth of the non-through hole.

According to one embodiment, the drilling of the at least one through hole is carried out with a first drill, and the drilling of the other non-through hole is then carried out with a second drill.

According to one embodiment, the drilling of the at least one through hole is simultaneous with the drilling of the other non-through hole, using a drill with two different diameters, also called a counterbore drill.

According to one embodiment, the step of manufacturing the support by molding comprises the use of a mold provided with at least one spike projecting from the surface of said mold, the at least one spike having a shape corresponding to the hollow volume delimited, in the wall of the support, by the edges of a through hole 2 and/or by the edges of a corresponding non-through hole 2'.

According to these arrangements, the step of manufacturing the support by molding, and the step of drilling said support, are simultaneous. According to these arrangements, the step of manufacturing the support by molding makes it possible to manufacture a support drilled with through holes and/or non-through holes.

According to one embodiment, the method comprises, after the step of forcefully inserting the at least one tuft, a step of depositing an adhesive at the level of the merged zone of the tuft.

According to one embodiment, the step of depositing the adhesive comprises a polymerization step.

According to one embodiment, the method comprises, after the step of depositing an adhesive, a step of filling the non-through holes.

According to one embodiment, the filling of the holes is carried out with a resin.

According to one embodiment, the filling of the holes is carried out by overmolding.

According to one embodiment, the method comprises after the insertion step, a step of hot deforming the brushing part.

According to one embodiment, the step of hot deforming the brushing part can be carried out before the step of depositing an adhesive, and filling the non-through holes.

According to these arrangements, the shape of the brushing part is better suited to the user dentition, and the adhesive and the filling material are preserved from the effects of the hot deformation step.

According to one embodiment, the step of hot deforming the brushing part can be carried out after the steps of depositing an adhesive, and of filling the non-through holes.

According to one embodiment, the step of hot deforming the brushing part can be carried out before and after the steps of depositing an adhesive, and of filling the non-through holes.

According to these arrangements, the shape of the brushing part is even better adjusted to the user dentition.

According to one embodiment, the brushing part comprises a connector, the connector comprising a gripping handle and at least one connection branch fixed to one end of the gripping handle, said at least one connection branch having a shape conforming the U-shape of at least part of the external side of the mouth guard of the brushing part, and the method comprises the following steps:
   attaching the at least one connection branch to a part of the external side of the mouth guard;
   fixing the at least one connection branch on a part of the external side of the mouth guard.

According to one embodiment, the fixing of the at least one connection branch on a part of the external side of the mouth guard, is carried out by overmolding.

The invention also concerns a brushing part comprising a support configured in a U-shape to be placed on the dentition of a jaw of a user, the support forming a mouth guard intended to receive on an internal side all or part of this dentition, the support comprising at least one tuft of brushing bristles projecting on the internal side of the mouth guard by a free end of the bristles of the at least one tuft,
   the at least one tuft of bristles, comprising a plurality of bristles assembled by one end, opposite the free end, so as to form a base of the at least one tuft;
   the base of the at least one tuft forming a merged zone in one part, an extension of the merged zone, in a direction transverse to a direction of extension of the at least one tuft, being greater than an extension from the base in the transverse direction before the formation of the merged zone;
   the at least one tuft of bristles passing through a hole passing through the mouth guard, between the internal side and an external side opposite to the internal side of the mouth guard formed by the support.

According to one embodiment, the invention comprises one or more of the following characteristics, alone or in combination.

According to one embodiment, the merged zone of the at least one tuft is inside another non-through hole formed in a wall of the mouth guard, the other non-through hole emerging onto the external side of the mouth guard.

According to one embodiment, the through hole has a first diameter and a first axis, and the other non-through hole has a second diameter about the first axis, the second diameter being greater than the first diameter.

According to one embodiment, the merged zone of the at least one tuft is adhered inside the non-through hole.

According to one embodiment, the non-through hole is filled with a resin.

According to one embodiment, the brushing part comprises a connector, the connector comprising a gripping handle and at least one connection branch fixed to one end of the gripping handle, said at least one connection branch having a shape which conforms the U-shape of at least part of the external side of the mouth guard of the brushing part, said at least one connection branch being attached to the part of the external side of the mouth guard.

According to these arrangements, the connector is configured to transmit to the brushing part vibrations generated by a vibration generator on which is removably fixed another end of the gripping handle.

According to one embodiment, the at least one connection branch has a flexibility which is combined with a flexibility of the mouth guard to transmit the vibrations generated by the vibration generator, without stiffening the mouth guard.

According to one embodiment, the other end of the gripping handle is configured to be fixed, in a removable manner, to the vibration generator, and comprises a gripping wall whose one section is in the shape of a rectangle or of a hexagon, said gripping wall being hollowed to allow insertion of an interface for fixing the vibration generator.

According to one embodiment, the hexagonal section of the gripping handle is configured with sides of unequal lengths to act as a keying device at the interface between the gripping handle and the vibration generator.

BRIEF DESCRIPTION OF THE DRAWINGS

For its proper understanding, an embodiment and/or implementation of the invention is described with reference to the accompanying drawings representing, by way of non-limiting example, an embodiment or implementation respectively of a device and/or a method according to the invention. Same references in the drawings denote similar elements or elements having similar functions.

DETAILED DESCRIPTION

Figure 7:
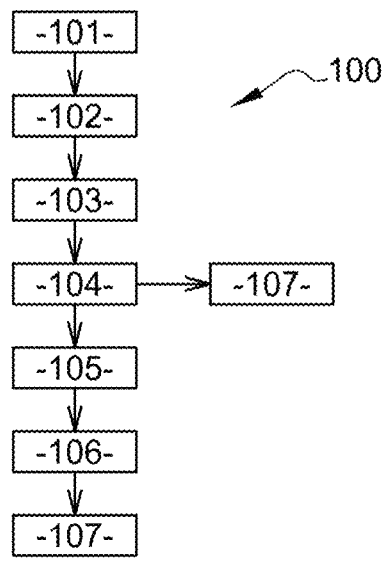
FIG. 7 is a schematic representation of a flowchart of the steps of the method according to the invention.

According to a first aspect, the invention concerns a method 100 for manufacturing the brushing part 1; a flowchart of the steps in the implementation of said method 100 is schematically represented in FIG. 7.

The method 100 comprises a first step 101 of providing a support 1' for the brushing part 1; said support 1' is made of a flexible plastic material, for example a thermoplastic elastomer or a silicone, preferably a Styrene-Ethylene-Butylene-Styrene. The support 1' is drilled with through holes 2, said holes passing through the mouth guard 6 formed by the support 1', between an internal side 6' and an external side 6" opposite to an internal side 6' of the mouth guard 6;

FIG. 1 represents a support 1' such as provided during the first step 101 of the method 100 for manufacturing the brushing part 1, according to one embodiment.

Figure 2:
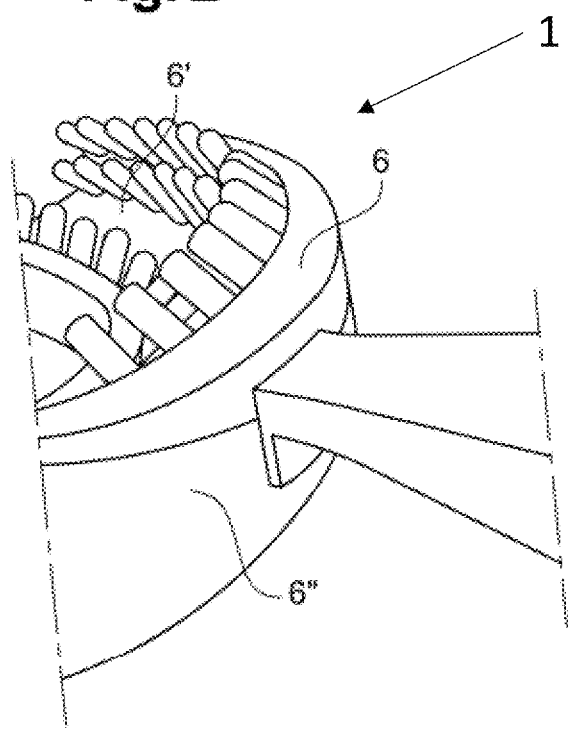
FIG. 2 is a perspective view of a support with spikes, obtained by molding from a perforated mold of the type represented in FIG. 6.

FIG. 2 represents a support 1', as provided during the first step 101 of the method 100 for manufacturing the brushing part 1, according to another embodiment.

Figure 3:
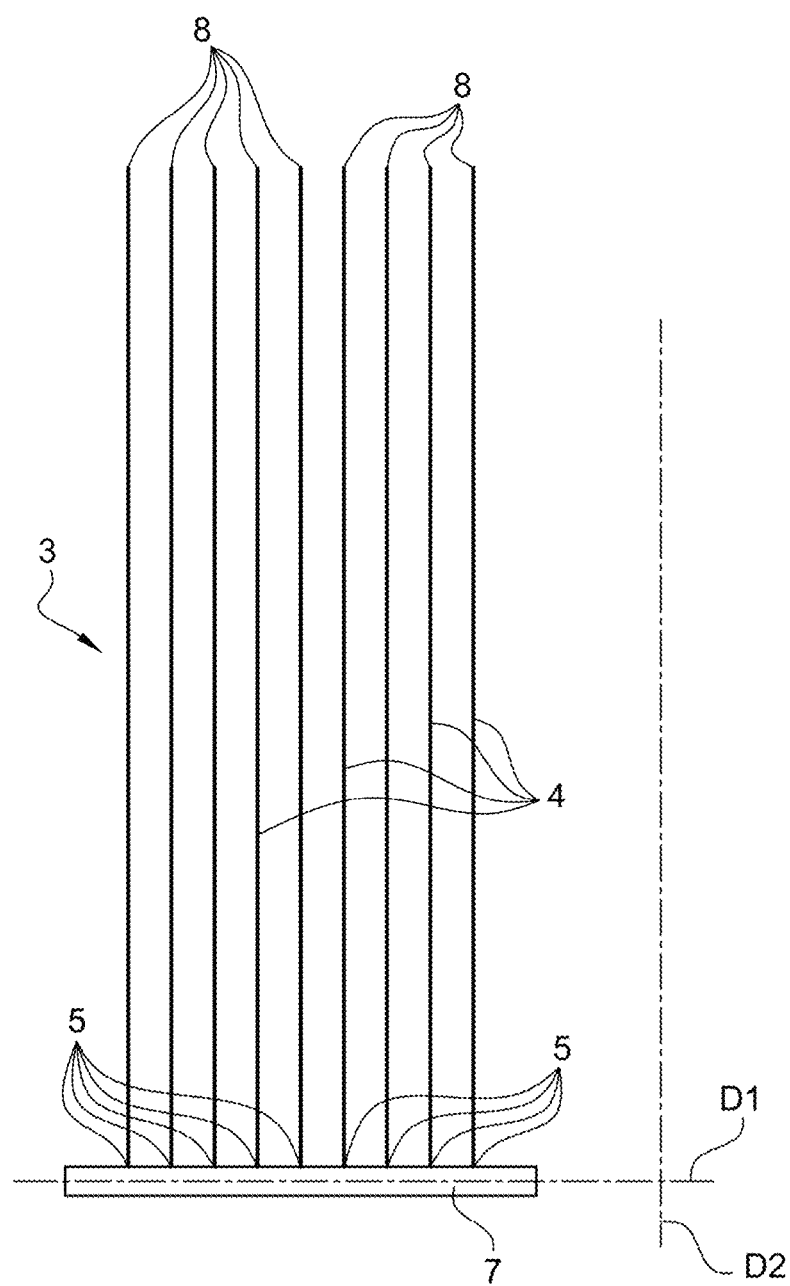
FIG. 3 is a representation of a tuft of bristles.
Figure 4:
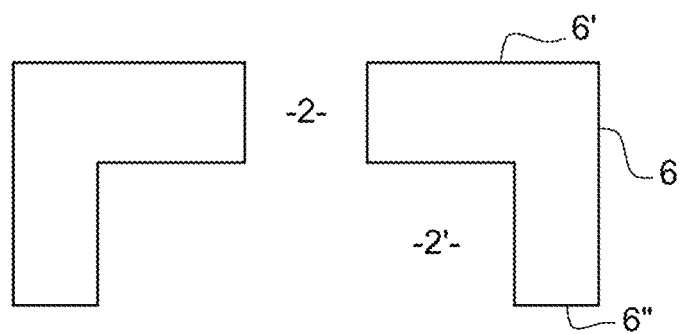
FIG. 4 is a view, in cross section through the wall, of a surface portion of the molded brush of FIG. 2, a surface portion crossed by a hole formed after the spikes of the molded brush of FIG. 2 have been cut and the through and non-through holes have been made.

The support 1' is configured in a U-shape to be placed on the dentition of a jaw of a user. More precisely, the support 1' has the shape of a mouth guard 6, the mouth guard 6 being configured in a U-shape; the support 1' is thus intended to receive all or part of this dentition. The support 1' could also be called mouth guard 6 in the remainder of this description. The support 1', or the mouth guard 6, includes a concave internal face 6' and an external face 6". The brushing part 1 comprises one or more tufts 3 of bristles 4, so the method 100 makes it possible to arrange and distribute over the internal face 6' of the mouth guard 6, the tufts 3 projecting inside this mouth guard 6; a tuft 3 of bristles 4 is schematically represented in FIG. 3, and the formation of a tuft 3 is described in more detail below.

Figure 1A:
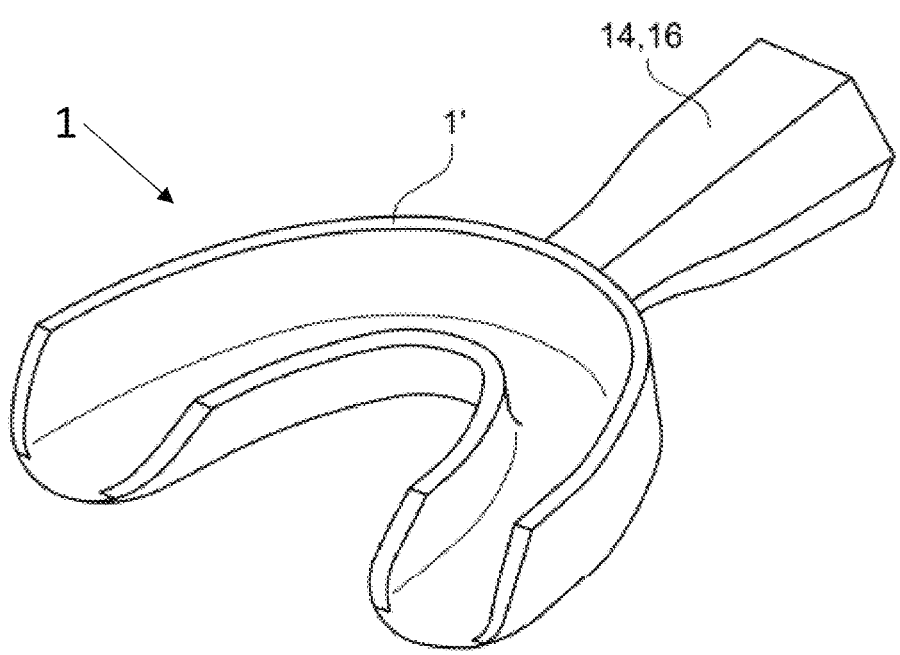
FIG. 1A is a perspective view of a support of a brushing part provided with its connector.
Figure 6:
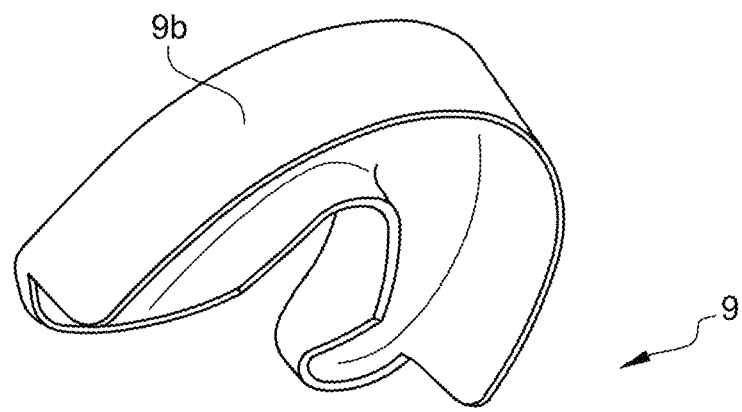
FIG. 6 is a perspective view of a two-part overmolding mold.
Figure 6:
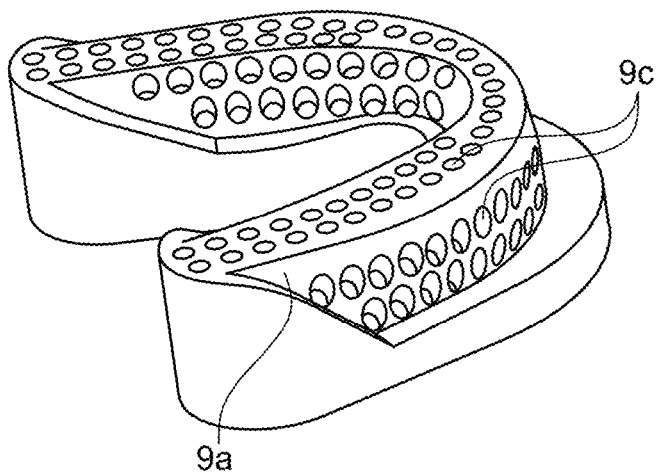

According to one embodiment, the step of providing the support 1' comprises a step of manufacturing 101 the support during which the support 1' of the brushing part 1 is molded from a manufacturing mold, the mold itself being U-shaped like the support 1'. According to one embodiment, the manufacturing mold is in two parts, with one part configured to fill the internal space 6' of the mouth guard 6 of the support 1' molded with the mold. The mold can be designed to produce a support 1' with a smooth internal face 6', without holes or spikes, as illustrated in FIG. 1a. The mold can also be designed to produce a support 1' directly with holes passing through the wall of the mouth guard 6, as will be described in more detail below. Finally, the mold can be designed to produce a support 1' with spikes on the internal face 6' of the mouth guard 6, as illustrated in FIG. 2; for this, a mold in two parts 9a, 9b like the mold 9 of FIG. 6 can for example be used, with a part 9a including holes 9c; thus, the support 1' produced with the mold 9 includes, on the internal face 6' of the mouth guard 6, spikes, said spikes corresponding to said holes 9c formed in the part 9a of the mold 9.

Figure 1B:
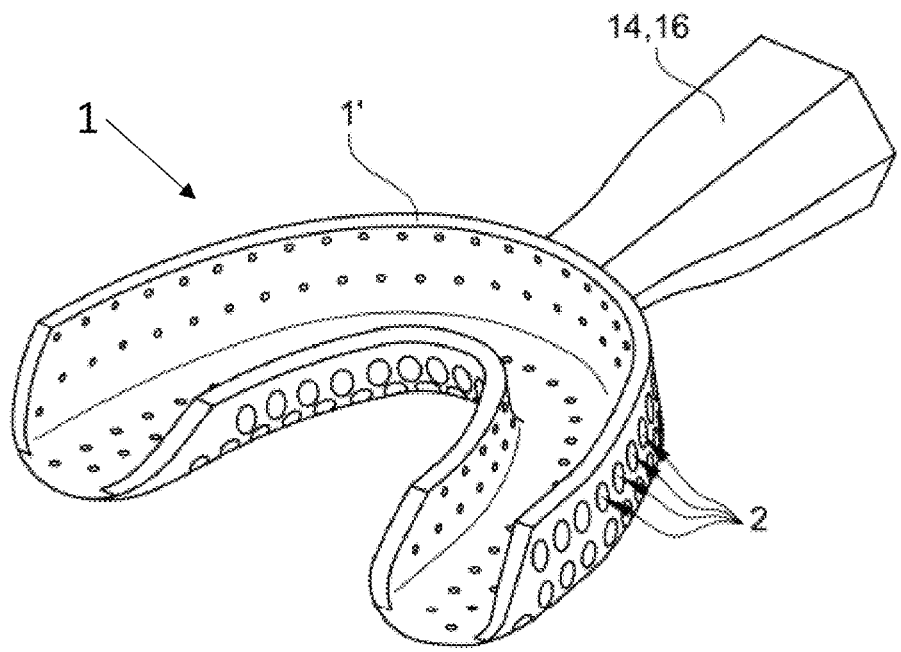
FIG. 1B is a perspective view of a support drilled with holes and provided with its connector.
Figure 1C:
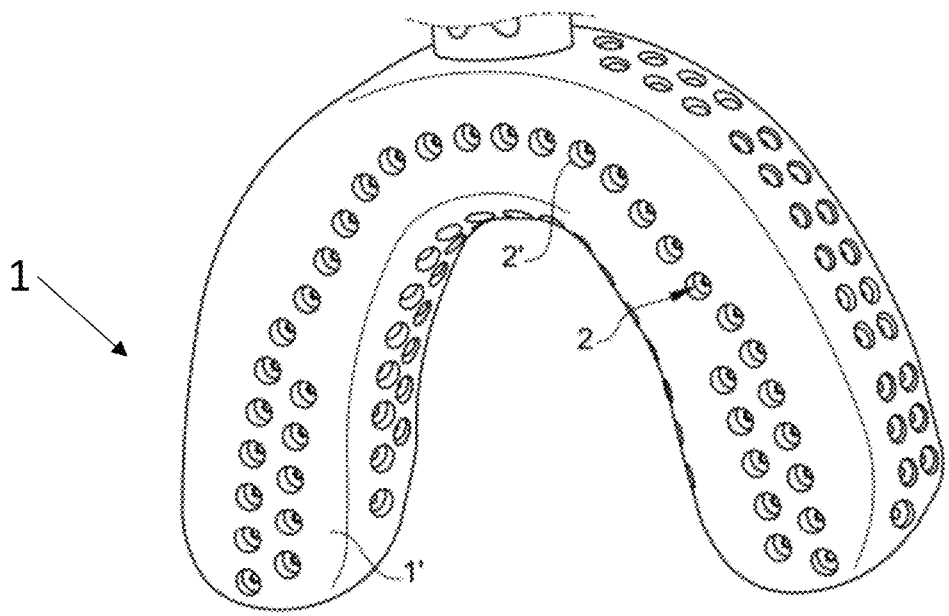
FIG. 1C is a perspective view of a support drilled with holes, each hole comprising a through hole and a non-through hole.

The support 1' provided during the manufacturing step 101, must include through holes 2 which pass through the mouth guard 6 formed by the support 1', between the internal side 6' and the external side 6" of the mouth guard 6. If the support 1', obtained in the manufacturing step 101, includes spikes, the spikes are removed before proceeding to a step of drilling 102 through holes 2, which follows the manufacture of the support 1'. FIGS. 1b and 1c show examples of support 1' drilled with through holes 2.

According to one embodiment, the step of drilling 102 through holes 2 also comprises the drilling of another non-through hole 2' corresponding to at least one through hole 2, at least one through hole 2 being drilled according to a first diameter and about a first axis, and the other non-through hole 2', being drilled according to a second diameter about the first axis, the second diameter being greater than the first diameter, the other non-through hole 2' being emerging on the external side 6" of the mouth guard 6. FIG. 1c shows an example of a support 1' drilled with holes, each hole comprising a through hole 2 and a corresponding non-through hole 2'.

By convention, the diameter of a hole or any object here designates the line segment, and/or the length of the line segment of greatest length which connects two points of a circumference or of a perimeter of the hole or of the considered object. This definition is applied to all forms of circumference or perimeter of a hole or object; thus, said circumference or said perimeter can be circular, or elliptical, for example.

The first diameter is determined based on the diameter of a cross section of the tufts 3, so that the diameter of a through hole 2 is always less than the diameter of a cross section of the tuft 3 which is inserted inside said through hole. According to one embodiment, the first diameter is comprised between 0.2 mm and 2 mm.

A forcefully inserting step 104 is made possible by the flexibility of the material constituting the support 1', which can be sufficiently deformed to enlarge the hole and allow the insertion of the tuft into the hole, and which is sufficiently elastic to take up its shape after the insertion step 104 so as to generate a first level of mechanical retention of the tuft inserted in the through hole 2.

The second diameter, that of the non-through holes 2', is greater than the largest dimension of the merged base 7 of the tufts 3, which must be housed inside the non-through holes 2', the definition of the merged base 7 of the tufts 3 being described below.

At the end of the following step of forcefully inserting 104 the tufts 3 of bristles 4, the merged base 7 of the tufts 3 is housed in a non-through hole 2' and bears on the bottom of said non-through hole 2'. According to these arrangements, an appropriate depth of the non-through hole determines an insertion depth of the tufts, and therefore a length of the free end.

According to one embodiment, the drilling of a through hole 2 is simultaneous with the drilling of the other non-through hole 2', corresponding to said through hole, for example by using a single drill with two different diameters, also called a counterbore drill.

According to one embodiment, the step 101 of manufacturing the support 1', by molding for example, and the step of drilling 102 through 2 and non-through 2' holes, are simultaneous; The simultaneity of the molding and the formation of said holes is obtained, for example, with the use of a mold provided with spikes projecting from the surface of said mold, each of said spikes having a shape corresponding to the hollow volume delimited, in the wall of the support 1', by the edges of a through hole 2 and the edges of a corresponding non-through hole 2'.

The next step of the method 100 according to the invention concerns the preparation of the tufts 3. Each tuft 3 comprises a plurality of bristles 4 assembled by one end 5 so as to form a base of the tuft 3, as illustrated in FIG. 3; the base of at least one tuft 3, comprising the assembly formed by the juxtaposition of one of the ends 5 of the bristles assembled into a tuft 3, is merged 7, by heating for example, so as to form a merged zone 7, said merged zone being integrally formed in the material of the bristles 4. The material of the bristles can be nylon, or animal silk, or else polybutylene terephthalate (PBT) for example. The bristles 4 of a tuft 3 have a length preferably less than 10 mm. The bristles are preferably substantially straight filaments, preferably ultra-fine, that is to say the diameter of the filaments is comprised between 60 µm and 120 µm, preferably 80 µm. Thanks to these arrangements, the bristles have dimensions compatible with the internal dimensions of the brushing part and can be arranged inside the mouth guard 6 to effectively brush the dentition also placed inside the mouth guard 6.

As shown in FIG. 3, each tuft 3 is longer in a direction of extension D2, than it is wide or thick, in a direction D1 transverse to the direction D2. The extension in the direction D1 of the base of a tuft 3 before the merging 103 of the ends 5 of the bristles 4 forming the base of the tuft is less than the extension in the direction D1 of the merged zone 7. The fusion of the material of the bristles at the ends 5 causes expansion of the base of the tuft 3, which thus assumes the shape of an inverted mushroom as illustrated in FIG. 3.

The free ends 8 of the bristles 4 of a tuft 3 can be rounded for efficient brushing without risk for the gum tissue.

Once the tufts 3 are formed as described above, each tuft 3 is forcefully inserted into one of the through holes 2 formed in the wall of the support 1', i.e. in the wall of the mouth guard 6, during a forcefully insertion step 104; the forcefully insertion is carried out in such a way that finally the free ends 8 of the bristles 4 of each tuft 3 project on the internal face 6' of the wall of the mouth guard 6 of the brushing part 1, while the merged zone 7 of a tuft 3 is placed on the side of the external face 6" of this wall. As previously indicated, the cross-section of the through hole 2 is always smaller than the cross-section of the tuft 3 which is inserted inside said through hole 2, so that the tuft 3 is firmly held in and by the edges of the through hole 2 of the mouth guard 6.

Figure 5:
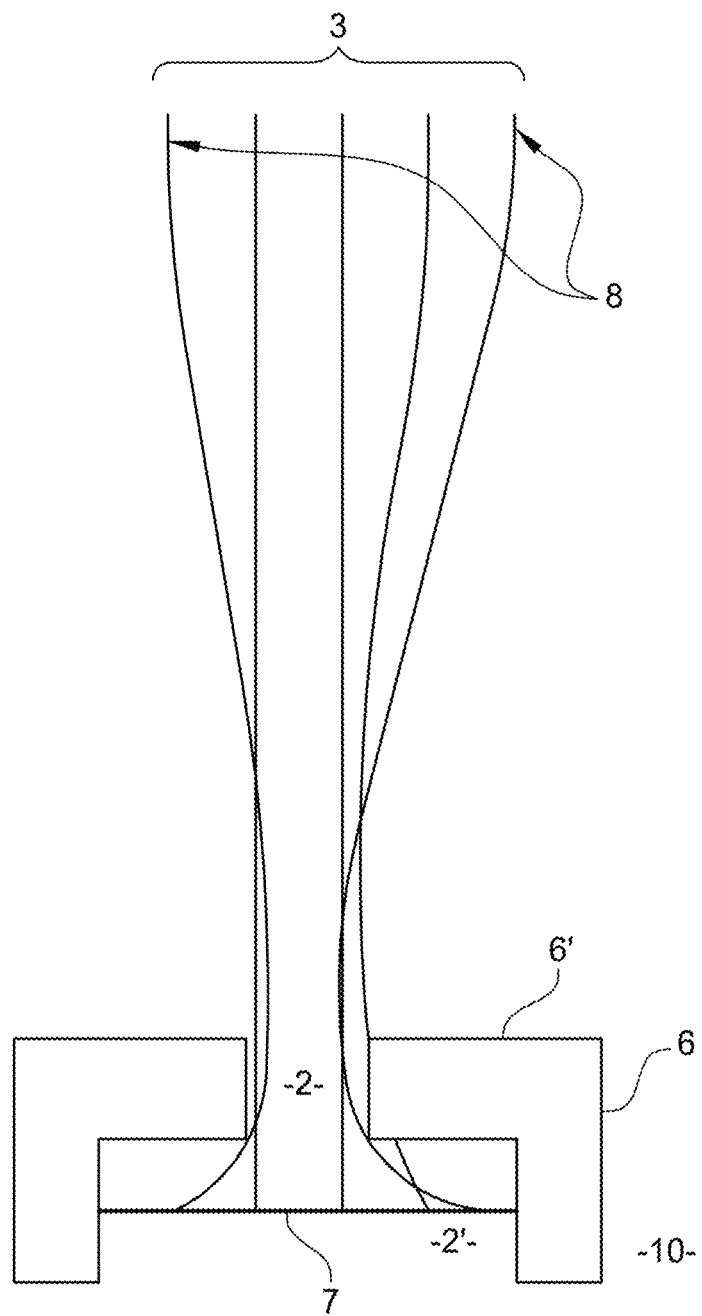
FIG. 5 is a representation of the result of the phase of inserting a tuft of bristles into the hole represented in FIG. 4.

According to one embodiment, the merged zone 7 of a tuft 3 is housed in the cavity formed by the non-through hole 2' corresponding to the through hole 2, on the side of the external face 6" of this wall, as represented in FIG. 5.

The material used to form the wall of the mouth guard 6 is, as indicated above, a flexible plastic material; according to one embodiment, this flexible plastic material allows the shape of the support 1' to be adjusted by hot deformation 107 of the brushing part 1, in order to best adapt it to the shape of the dentition of the user of the brushing part 1. This step of hot deformation 107 is carried out after the step 104 of forcefully inserting the tufts 3.

In order to further strengthen the holding of the tuft 3, a step of depositing 105 an adhesive at the level of the merged zone of the tuft 3, after the step of forcefully inserting 104 the tufts 3 in the holes 2, can be provided. Thus, thanks to the mechanical strength resulting from the pressure of the edges of the through hole 2 on the tuft 3 forcefully inserted on the one hand, and thanks to the mechanical strength resulting from the bearing of the merged base 7 of the tuft 3 on the bottom of the non-through hole 2', finally thanks to the chemical adhesion of the adhesive deposited at the interface about the merged base 7 of the tuft 3 and at the bottom of the non-through hole 2', the adhesion between the tuft 3 and the support 1' can withstand a tensile force of at least 15 Newtons.

According to one embodiment, the adhesive is an adhesive which polymerizes under the action of ultraviolet rays, in other words a UV adhesive.

According to one embodiment, the step of depositing the adhesive comprises a polymerization step.

In order to create a smooth wall on the external face 6" of the mouth guard 6, a step 106 of filling the non-through holes 2' can be provided.

According to one embodiment, the filling 106 of the holes 2' is made with a resin.

According to one embodiment, the filling 106 of the holes 2' is made by overmolding.

As indicated above, the hot deformation step 107 is carried out after the step 104 of forcefully inserting the tufts 3. According to one embodiment, the step of hot deforming 107 the brushing part can be carried out before the step of depositing 105 an adhesive, and of filling 106 the non-through holes 2'. According to these arrangements, the shape of the brushing part is better suited to the user dentition, and the adhesive and the filling material are preserved from the effects of the hot deformation step.

According to one embodiment, the step of hot deforming 107 the brushing part can be carried out after the steps of depositing 105 an adhesive, and of filling 106 the non-through holes 2'.

According to one embodiment, the step of hot deforming 107 the brushing part can be carried out before and after the steps of depositing 105 an adhesive, and of filling 106 the non-through holes 2'. According to these arrangements, the shape of the brushing part is even better adjusted to the user dentition.

In order to improve the efficiency of brushing, a plurality of tufts 3 are distributed over the internal faces of the wall of the mouth guard 6; as illustrated in FIGS. 1 to 3, the direction of extension D2 of a tuft 3 has an inclination relative to the direction perpendicular to the face considered at the point where the tuft 3 projects on the face of the mouth guard 6, which can vary between 0 degrees, for example for a tuft 3 planted at the bottom of the mouth guard 6, and 45 degrees, for example, preferably directed towards the top of the mouth guard 6, for a tuft 3 planted on the lateral parts of the internal side 6' of the mouth guard 6. Thus, the direction of extension D2 of a tuft 3 can form an angle of 90 degrees, for example with the direction of extension D2 of another tuft 3. Thanks to these arrangements, the tufts of bristles are arranged to effectively brush the dentition positioned inside the mouth guard.

According to one embodiment of the invention, the distribution of the projecting tufts of bristles on the internal face of the mouth guard 6 is adjusted so as to maximize the density of bristles locally and thus improve the efficiency of brushing. To this end, a staggered distribution of the holes on the overmolding mold can be selected.

Figure 8:
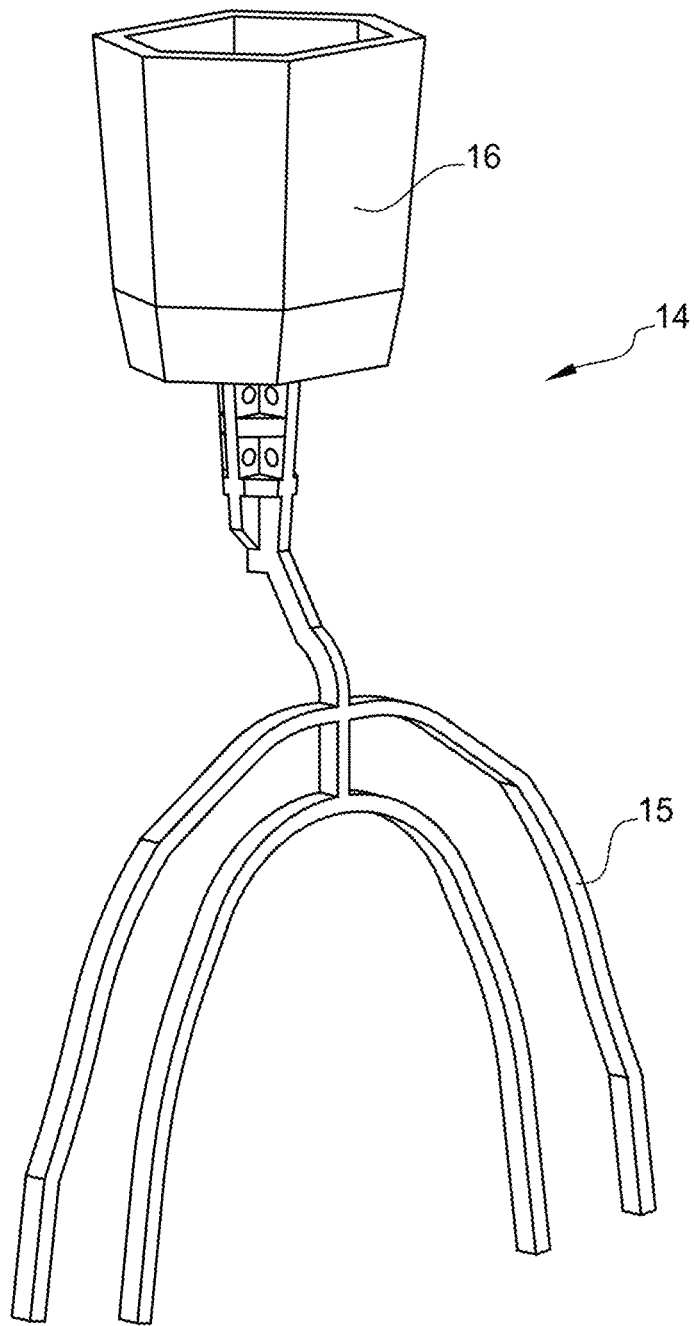
FIG. 8 is a perspective view of a connector according to a first variant, with a hexagonal-based gripping handle.
Figure 9:
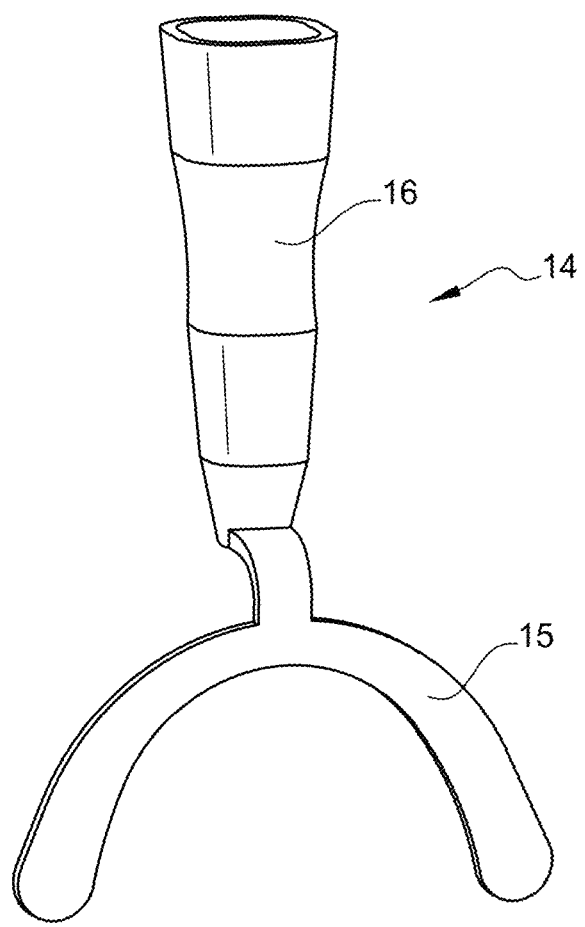
FIG. 9 is a perspective view of a connector according to a second variant with a square-based gripping handle.

According to one embodiment, the brushing part 1 comprises a connector 14, the connector 14 comprising a gripping handle 16 and at least one connection branch 15 fixed to one end of the gripping handle 16; an embodiment of a connector is illustrated in FIG. 8 and another embodiment is illustrated in FIG. 9. Said at least one connection branch 15 has a shape conforming the U-shape of at least part of the external side 6" of the mouth guard 6 of the brushing part 1, and the method 100 comprises the following additional steps:

attaching the at least one connection branch 15 on a part of the external side 6" of the mouth guard 6;

fixing the at least one connection branch 15 on a part of the external side 6" of the mouth guard 6.

According to one embodiment, the fixing of the at least one connection branch 15 on the part of the external side 6" of the mouth guard 6, is carried out by overmolding.

Figure 10:
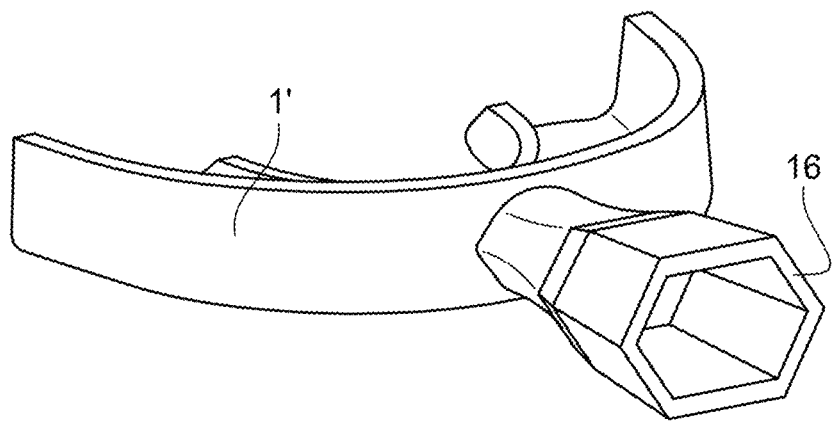
FIG. 10 is a perspective view from another angle, of a support, provided with a connector according to the first variant.

FIG. 10 illustrates an example of a support 1' of a brushing part on which the connection branch 15 of a connector 16 has been attached, then fixed by overmolding.

According to another aspect, the invention concerns a brushing part 1 comprising a support 1' configured in a U-shape to be placed on the dentition of a jaw of a user, the support forming a mouth guard 6 intended to receive on an internal side 6' of all or part of this dentition, the support 1' comprising at least one tuft 3 of brushing bristles 4 projecting on the internal side 6' of the mouth guard 6 by a free end 8 of the bristles 4 of the at least one tuft 3, the at least one tuft 3 of bristles 4, comprising a plurality of bristles (4) assembled by one end 5, opposite to the free end 8, so as to form a base of at least one tuft 3; the base of at least one tuft 3 forming a merged zone 7 in one part, an extension of the merged zone 7, in a direction D1 transverse to an extension direction D2 of at least one tuft 3, being greater than an extension of the base in the transverse direction D1 before the formation of the merged zone 7;

the at least one tuft of bristles 3 passing through a hole 2 passing through the mouth guard 6, between the internal side 6' and an external side 6" opposite the internal side 6' of the mouth guard 6, formed by the support 1'.

According to one embodiment, the merged zone 7 of at least one tuft 3 is inside another non-through hole 2', formed in a wall of the mouth guard 6, the other non-through hole 2' being emerging on the external side 6" of the mouth guard 6.

According to one embodiment, the merged zone of the at least one tuft is adhered inside the non-through hole.

According to one embodiment, the non-through hole is filled with a resin.

According to one embodiment, the brushing part 1 comprises a connector 14, the connector comprising a gripping handle 16 and at least one connection branch 15 fixed to one end of the gripping handle 16, said at least one connection branch 15 having a shape which matches the U-shape of at least part of the external side 6" of the mouth guard 6 of the brushing part 1, said at least one connecting branch 15 being attached on the part of the external side 6" of the mouth guard 6.

According to these arrangements, the connector is configured to transmit to the brushing part vibrations generated by a vibration generator on which is removably fixed another end of the gripping handle.

According to one embodiment, at least one connection branch 15 has sufficient flexibility so as not to reduce the intrinsic flexibility of the mouth guard 6, while transmitting the vibrations generated by the vibration generator.

According to one embodiment, the other end of the gripping handle 16, configured to be fixed, in a removable manner, to the vibration generator, comprises a gripping wall, whose section is in the shape of a square or hexagon, said gripping wall being hollowed to allow the insertion of a fixing interface of the vibration generator.

According to one embodiment, the hexagonal section of the gripping handle is configured with sides of unequal lengths, as illustrated in FIG. 10, to act as a keying function at the interface between the gripping handle and the vibration generator.

The invention claimed is:

1. A method for manufacturing a brushing part, the brushing part comprising a support configured in a U-shape to be placed on a dentition of a jaw of a user, the support forming a mouth guard intended to receive on an internal side all or part of the dentition, the brushing part comprising at least one tuft of brushing bristles projecting on the internal side of the mouth guard by a free end of the brushing bristles of the at least one tuft of brushing bristles, the method comprising the following steps:

providing the support, the support being drilled with at least one through hole, passing through the mouth guard formed by the support, between the internal side and an external side opposite to the internal side of the mouth guard;

forming the at least one tuft of brushing bristles, by assembling a plurality of bristles by one end opposite the free end, so as to form a base of the at least one tuft of brushing bristles, such that a diameter of a section of the at least one tuft of brushing bristles, in a plane transverse to a direction of extension of the at least one tuft of brushing bristles, is greater than a diameter of the at least one through hole;
merging ends of the plurality of bristles forming the base of the at least one tuft of brushing bristles so as to form a merged zone in one part, so that an extension of the merged zone in a direction transverse to the direction of extension of the at least one tuft of brushing bristles is greater than an extension of the base in the transverse direction before the merging step;
forcefully inserting the at least one tuft of brushing bristles in the at least one through hole of the mouth guard formed by the support.

2. The method according to claim 1, wherein the providing step comprises:
a step of manufacturing the support;
a step of drilling the at least one through hole passing through the mouth guard, between the internal side and the external side opposite the internal side of the mouth guard, formed by the support.

3. The method according to claim 2, wherein the step of manufacturing the support comprises a molding of the support from a molding mold.

4. The method according to claim 3, wherein the step of drilling the at least one through hole also comprises drilling of another non-through hole corresponding to at least one through hole, the at least one through hole being drilled according to a first diameter and about a first axis, and the another non-through hole, being drilled according to a second diameter about the first axis, the second diameter being greater than the first diameter, the another non-through hole being emerging on the external side of the mouth guard.

5. The method according to claim 4, wherein, in the step of drilling, the drilling of the at least one through hole is performed with a first drill, and the drilling of the another non-through hole is made with a second drill.

6. The method according to claim 2, wherein the step of drilling the at least one through hole also comprises drilling of another non-through hole corresponding to at least one through hole, the at least one through hole being drilled according to a first diameter and about a first axis, and the another non-through hole, being drilled according to a second diameter about the first axis, the second diameter being greater than the first diameter, the another non-through hole being emerging on the external side of the mouth guard.

7. The method according to claim 6, wherein, in the step of drilling, the drilling of the at least one through hole is performed with a first drill, and the drilling of the another non-through hole is made with a second drill.

8. The method according to claim 6, wherein, in the step of drilling, the drilling of the at least one through hole is simultaneous with the drilling of the another non-through hole, using a drill with two different diameters.

9. The method to claim 6, wherein the step of manufacturing the support comprises a molding of the support from a molding mold and the step of manufacturing the support by molding comprises the use of a mold provided with at least one spike projecting on a surface of the mold, the at least one spike having a shape corresponding to a hollow volume delimited, in a wall of the support, by edges of the through hole and/or by edges of the another non-through hole, so that the drilling of the at least one through hole is simultaneous with the drilling of the another non-through hole and with the step of molding the support.

10. The method according to claim 6, comprising after the step of forcefully inserting the at least one tuft of brushing bristles, a step of depositing an adhesive in a level of the merged zone of the at least one tuft of brushing bristles and after the step of depositing an adhesive, a step of filling the another non-through hole.

11. The method according to claim 1, comprising after the step of forcefully inserting the at least one tuft of brushing bristles, a step of depositing an adhesive in a level of the merged zone of the at least one tuft of brushing bristles.

12. The method according to claim 1, comprising after the forcefully inserting step, a step of hot deforming the brushing part.

13. The method according to claim 1, wherein the brushing part comprises a connector, the connector comprising a gripping handle and at least one connection branch fixed to one end of the gripping handle, the at least one connection branch having a shape conforming the U-shape of at least part of the external side of the mouth guard of the brushing part, the method comprising the following steps:
attaching the at least one connection branch to the at least part of the external side of the mouth guard; and
fixing the at least one connection branch on the at least part of the external side of the mouth guard.

14. A brushing part comprising a support configured in a U-shape to be placed on a dentition of a jaw of a user, the support forming a mouth guard intended to receive on an internal side all or part of the dentition, the support comprising at least one tuft of brushing bristles (4) projecting on the internal side of the mouth guard by a free end of the brushing bristles of the at least one tuft of brushing bristles,
the at least one tuft of brushing bristles, comprising a plurality of bristles assembled by one end, opposite the free end, so as to form a base of the at least one tuft of brushing bristles;
the base of the at least one tuft of brushing bristles forming a merged zone in one part, an extension of the merged zone, in a direction transverse to a direction of extension of the at least one tuft of brushing bristles, being greater than an extension of the base in the transverse direction before the formation of the merged zone;
the at least one tuft of brushing bristles passing through a through hole passing through the mouth guard, between the internal side and an external side opposite the internal side of the mouth guard formed by the support.

15. The brushing part according to claim 14, wherein the merged zone of the at least one tuft of brushing bristles is inside another non-through hole, formed in one wall of the mouth guard, the another non-through hole emerging onto the external side of the mouth guard.

16. The brushing part according to claim 15, wherein the through hole has a first diameter and a first axis, and the another non-through hole has a second diameter about the first axis, the second diameter being greater than the first diameter.

17. The brushing part according to claim 14, comprising a connector, the connector comprising a gripping handle and at least one connection branch fixed to one end of the gripping handle, the at least one connecting branch having a shape which conforms the U-shape of at least part of the external side of the mouth guard of the brushing part, the at least one connection branch being attached to the part of the external side of the mouth guard.

18. The brushing part according to claim 17, wherein the at least one connection branch has a flexibility which combines with a flexibility of the mouth guard to transmit vibrations generated by a vibration generator, without stiffening the mouth guard.

19. The brushing part according to claim 18, wherein an other end of the gripping handle is configured to be attached, in a removable manner, to the vibration generator, and comprises a gripping wall whose one section is in the shape of a rectangle or a hexagon, the gripping wall being hollowed to allow the insertion of a fixing interface of the vibration generator.

20. The brushing part according to claim 19, wherein the one section in the shape of a hexagon is configured with sides of unequal lengths to act as a keying function at an interface between the gripping handle and the vibration generator.

\* \* \* \* \*